May 24, 1932.   J. P. BROWN   1,860,230
DEFLECTION OR DEVIATION INDICATOR
Filed Sept. 20, 1930    4 Sheets-Sheet 1

Inventor,
J. P. Brown

May 24, 1932. J. P. BROWN 1,860,230
DEFLECTION OR DEVIATION INDICATOR
Filed Sept. 20, 1930 4 Sheets-Sheet 2

Inventor,
J. P. Brown

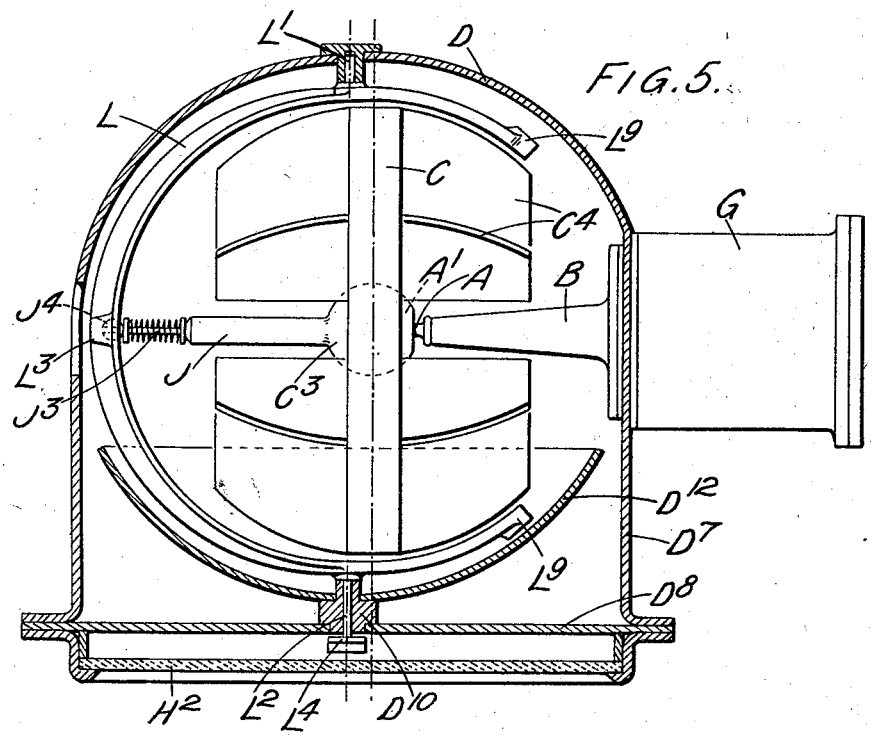
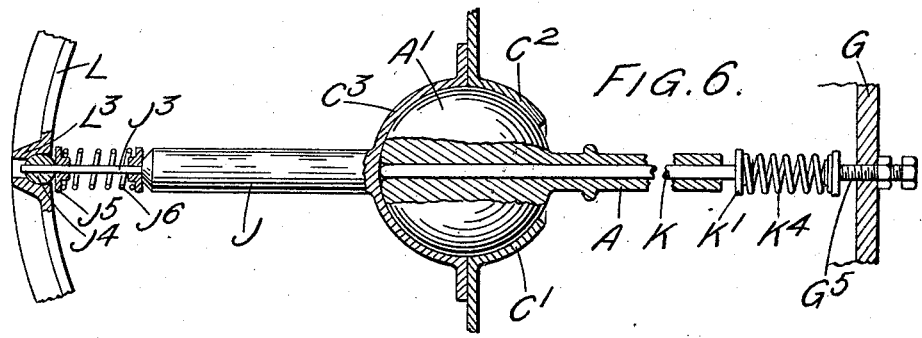
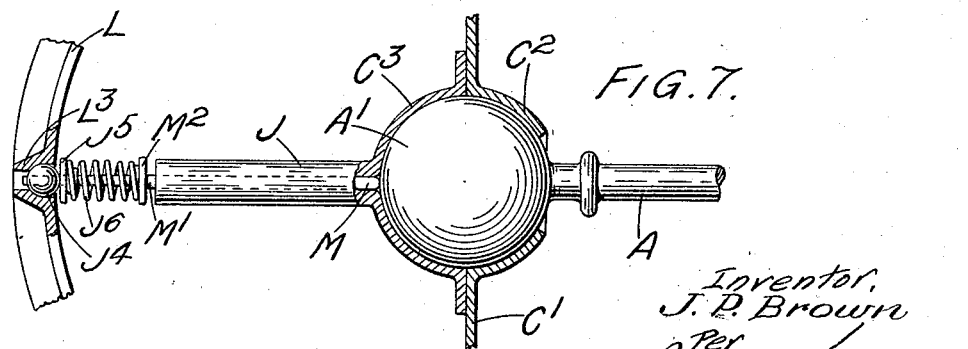

May 24, 1932.  J. P. BROWN  1,860,230
DEFLECTION OR DEVIATION INDICATOR
Filed Sept. 20, 1930   4 Sheets-Sheet 4
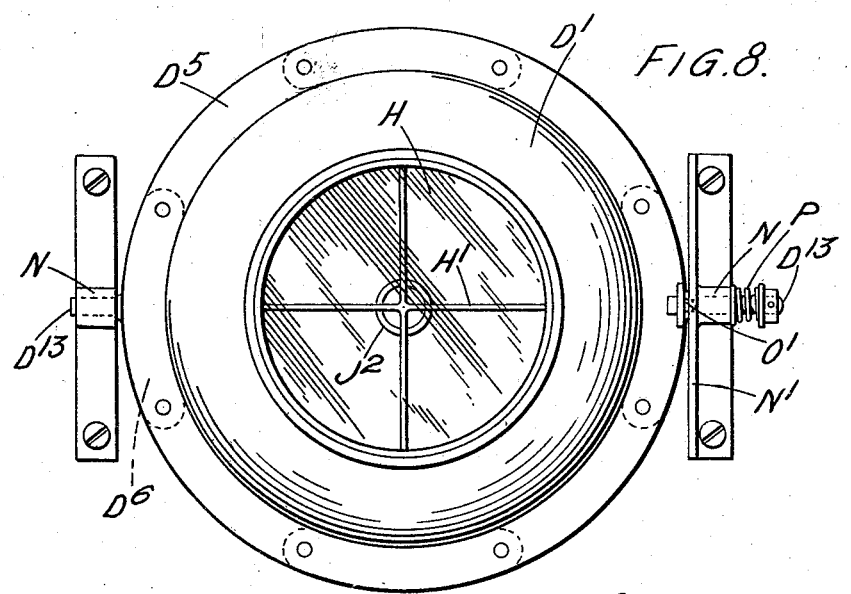
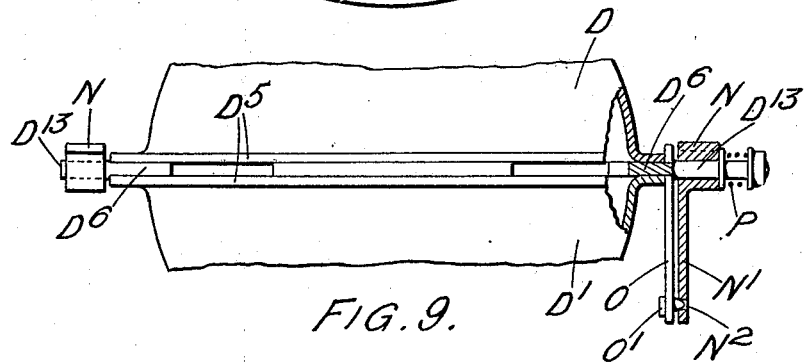
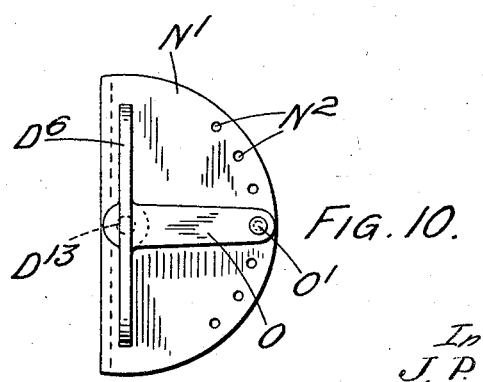
Inventor,
J. P. Brown Patented May 24, 1932

1,860,230

UNITED STATES PATENT OFFICE

JOHN POLLOCK BROWN, OF NEW MALDEN, ENGLAND

DEFLECTION OR DEVIATION INDICATOR

Application filed September 20, 1930, Serial No. 483,360, and in Great Britain October 17, 1929.

This invention relates to deflection or deviation indicators and more especially instruments of this nature intended for navigational purposes, and has for its main object to provide an instrument of simple and inexpensive structure as compared with indicators of known type which operate on gyroscopic principles.

Another object of the invention is to provide an indicator comprising in combination a spindle to which rotation is imparted by suitable means, a rotor substantially balanced about its centre of rotation and mounted on the spindle with interengaging curved bearing members respectively carried by the spindle and the rotor the curvature of the surface of each of these bearing members being such as to coincide with the surface of a sphere whose centre lies on the spindle axis, rotation being transmitted from the spindle to the rotor by friction between the curved bearing surfaces, and means whereby slip is caused to occur between the interengaging bearing surfaces such that in the event of angular displacement of the spindle the rotor will not be constrained to maintain its axis coincident with the spindle axis but the rotor axis will be able to oscillate about the bearing centre.

Other objects will be in part obvious from the annexed drawings and in part indicated from the following analysis of the invention, in which reference is made to the accompanying drawings illustrating an embodiment of my idea.

The invention may be carried into practice in various ways but the accompanying drawings illustrate by way of example structures that may be adopted in practice. In these drawings—

Figure 5 is a part sectional plan similar to Figure 3 showing a modified form of the construction shown in Figure 3.

Figure 6 is a view partly in section on an enlarged scale showing two restraining devices that may be employed in the construction shown in Figure 5.

Figure 7 is a view similar to Figure 6 showing alternative arrangements of restraining devices such as indicated in Figure 6.

Figure 8 is an end view of the construction shown in Figure 1 illustrating one method of mounting the apparatus so as to permit of its adjustment.

Figure 9 is a part sectional plan of the apparatus and its mounting shown in Figure 8.

Figure 10 is a detail of the adjustable mounting shown in Figures 8 and 9.

Like letters indicate like parts throughout the drawings.

Figure 1:
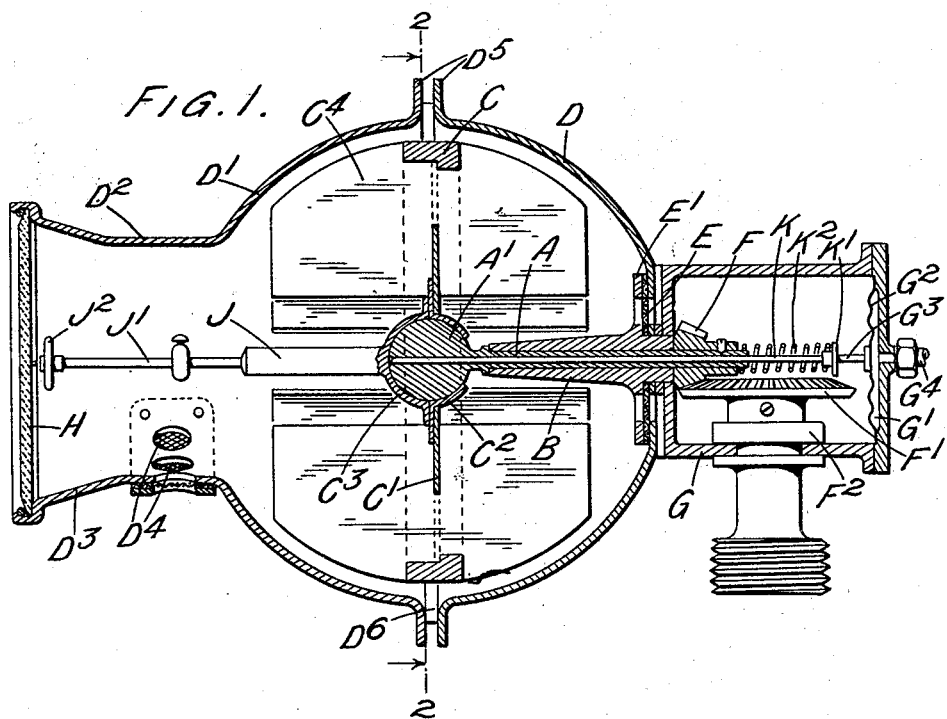
Figure 1 is a sectional elevation of one form of the improved deflection or deviation indicator.
Figure 2:
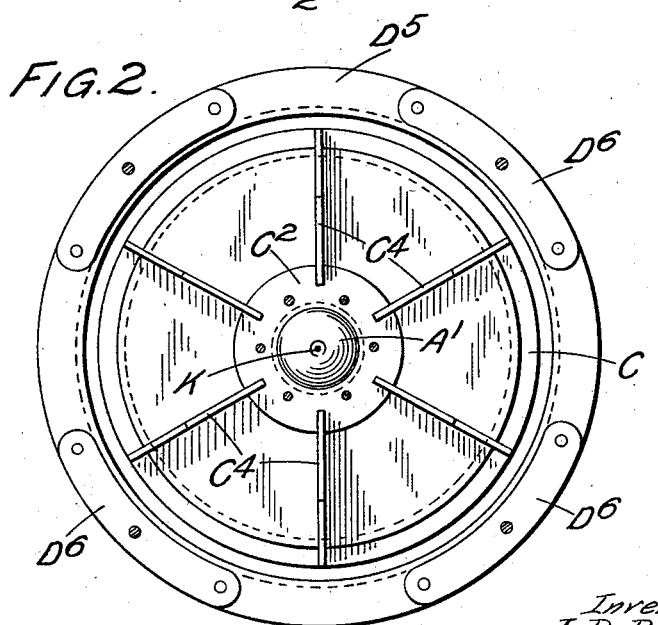
Figure 2 is a transverse sectional elevation on the line 2—2 in Figure 1 looking in the direction of the arrows, the one part of the outer casing and the outer part of the rotor cup bearing being removed.

Referring to the construction shown in Figures 1 and 2, a spindle A of such structure and dimensions as may be desirable is rotatably mounted in a bearing B of suitable type. The spindle carries at one end a sphere $A^1$ preferably formed integral with the spindle and constituting a bearing member. The rotor C comprises a disc-like member $C^1$ with a weighted rim or peripheral part of suitable form, the disc being carried on a hub comprising two separable cup-like parts $C^2$ and $C^3$ which when they are connected together form a hollow spherical bearing member which engages the spherical bearing member $A^1$. The clearance between these curved bearing surfaces is such as to allow a thin film of lubricant to be maintained between them. The cup-shaped hub bearing member $C^2$, $C^3$ is formed so as to allow the rotor freedom to move independently of the spindle A so that its axis can oscillate about the centre of the spherical bearing member $A^1$. The rotor carries a series of vanes $C^4$ disposed preferably radially and so that they lie at right angles to the plane of the rotor disc $C^1$. The peripheral portions of these vanes have a curved contour substantially coincident with a sphere whose centre coincides with the centre of the spherical bearing member $A^1$. When the spindle A is rotated, rotation will be imparted therefrom to the rotor C through the interengaging spherical bearing surfaces of the members $A^1$ and $C^2$, $C^3$. Owing to the action of the air on the vanes $C^4$, a drag or constraint will be exerted on the rotor so that it will rotate at a speed less than that of the spindle. If now the spindle A is angularly displaced, owing to the slip between the interengaging bearing members, the rotor will not follow immediately the angular movement of the spindle but the rotor axis will be deflected about the centre of the bearing and relatively to the axis of the spindle, thus enabling an indication to be obtained of the angular deflection or deviation of the spindle A and the body on which it is mounted.

The rotor is enclosed within a casing conveniently formed in two separable parts D, $D^1$ which together have as a whole a substantially spherical form, the centre of the casing coinciding with the centre of the spherical bearing member $A^1$. The dimensions of the casing and of the vanes $C^4$ are such that the peripheral portions of the latter lie adjacent to the inner wall of the casing D, $D^1$. At one side the casing member D has fixed therein the spindle bearing B, the mounting of this bearing conveniently being such that openings E are provided covered by gauze or the like $E^1$, so as to allow for the flow of air into the casing. The end of the spindle A projects beyond the bearing B on the outer side of the casing D and in the arrangement illustrated this end of the spindle carries a bevel pinion F which engages a bevel wheel $F^1$ mounted on the end of a shaft rotatably carried in a bearing $F^2$ mounted in a suitable casing G which is fixed in some convenient manner to the casing D. The bevel wheel $F^1$ can be driven by flexible shafting or other means from some convenient source of power so as to impart rotation at the desired speed to the spindle A.

The part $D^1$ of the outer casing which lies remote from the spindle A and its bearing is provided with a tubular or bell-shaped extension $D^2$, part of which $D^3$ is given a conical formation the apex of this cone lying on the axis of the spindle A and conveniently adjacent to the centre of the spherical bearing member $A^1$. The mouth of the conical extension is closed by a glass plate H constituting a window on which are locating marks such as the crossed lines $H^1$ shown in Figure 8. In the tubular extension $D^2$ there are preferably provided openings $D^4$ covered by gauze and through these openings air can flow into the casing. Rigidly mounted on the cup member $C^3$ of the rotor hub is an arm J which extends normal to the plane of the rotor disc $C^1$ and thus coincident with the rotor axis. The outer portion $J^1$ of this arm is conveniently of a resilient structure and at or near its end the arm carries a small roller $J^2$. If the angular displacement of the spindle A is such as to cause the rotor axis to be deflected beyond a limit determined by the dimensions of the conical part $D^3$ of the casing extension, the roller $J^2$ on the end of the arm J $J^1$ will come into contact with the conical part $D^3$ of the extension and damage to the rotor will be obviated. The outer end of the arm $J^1$ or the roller $J^2$ thereon cooperates with the markings $H^1$ on the window H (see Figure 8) so as to give an indication of the deflections of the rotor axis relative to the axis of the spindle A.

The two portions D, $D^1$ of the casing are provided with substantially radial flanges $D^5$, which can be bolted together but with distance pieces $D^6$ interposed so as to leave openings through which air may flow out from the casing.

In order to enable the axes of the rotor and spindle to be restored quickly and when desired to substantial coincidence after deflection of the rotor axis has occurred, an arrangement such as illustrated in Figure 1 may be employed. In a hole which extends throughout the centre of the spindle A there lies and can slide a rod K. The end of the hole in the spindle lies in the wall of the spherical bearing member $A^1$, and the end of the rod K which lies at this end of the hole is rounded. By applying pressure to the outer end of the rod K its rounded inner end can be pressed into contact with the inner surface of the rotor cup bearing member $C^3$, with the result that if the rotor axis has been deflected this axis will be quickly restored to substantial coincidence with the axis of the spindle A. The rod K may be arranged in various ways so as to enable this pressure to be applied as and when desired. In the arrangement shown, the outer end of the rod is provided with a collar or flanged cap $K^1$ and between this collar and the adjacent end of the spindle A or some part carried thereon is arranged a coiled spring $K^2$ the spring thus tending to withdraw the inner end of the rod K from contact with the rotor bearing member $C^3$. The wall of the casing G which lies opposite the outer end of the spindle K is formed with a chamber $G^1$ the inner side of which is constituted by a flexible diaphragm $G^2$ carrying centrally a projection $G^3$ whose rounded end bears against the outer end of the spindle K or the flanged cap $K^1$ on the end of this spindle. A pipe $G^4$ leads from the chamber $G^1$ the pipe and the chamber being filled with fluid such as air or oil. By means of a push button device of some suitable structure, pressure can be applied to the diaphragm $G^2$ in such a manner as to force the rod K inwardly and thereby press its rounded end into contact with the rotor cup bearing member $C^3$. As soon as this pressure is relaxed, the spring $K^2$ will again withdraw the rod K.

In place of the inner end of the rod K being adapted to be brought into contact with the inner surface of the rotor bearing member $C^3$, there may be interposed between these parts a ball which rests in the end of the hole in the spindle A in which lies the rod K. Then when the rod is pushed inwards, pressure will be transmitted to the ball so as to cause it to bear on the inner surface of the rotor cup member.

Lubrication of the interengaging curved bearing surfaces may be effected by delivering oil through a hole extending axially through the spindle A whether this hole carries therein a sliding rod K as above described or not. The lubricant may be supplied from a suitable source at the outer end of the spindle A, the supply being such as to maintain a thin film of lubricant between the bearing surfaces. A convenient arrangement is to deliver lubricant into the casing G whence it can find its way to the curved bearing surfaces through the hole in the spindle A, this source also serving to supply lubricant to the bearing B of the spindle A.

Figure 3:
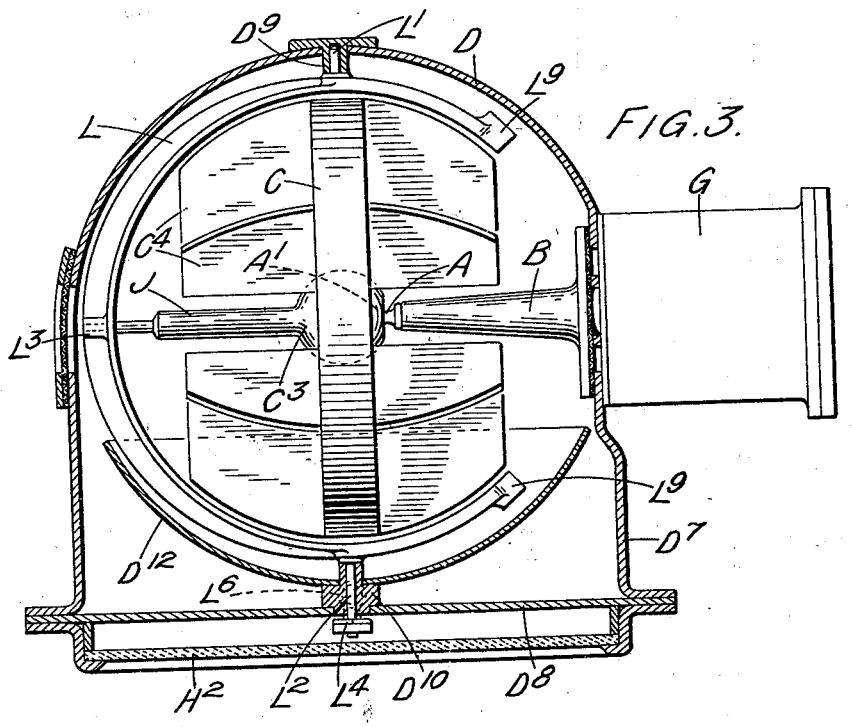
Figure 3 is a part sectional plan showing an alternative construction.
Figure 4:
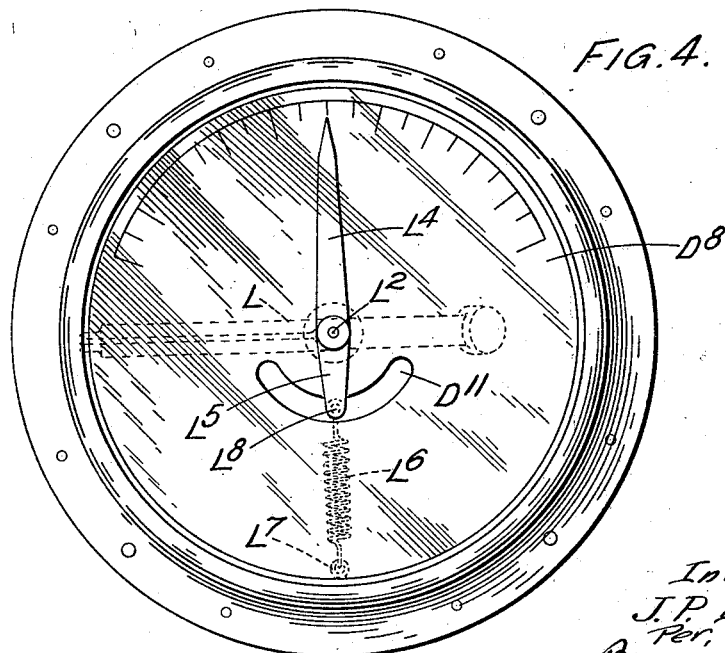
Figure 4 is a side elevation of the construction illustrated in Figure 3 showing the indicator dial.

Turning now to the alternative construction shown in Figures 3 and 4, the rotor and spindle are here constructed and arranged with respect to their principal features as described and shown in Figures 1 and 2. In this case, however, the arm J which extends from the rotor does not function directly as a pointer or indicator, but through this arm constraint is exercised on the rotor with respect to oscillations of the rotor axis in one plane. The structure of the casing is somewhat modified, one part having a spherical formation as shown in Figure 3 while opposite this part is a tubular member $D^7$ which carries a disc-like plate $D^8$. Suitable air inlet covered by gauze are provided in the neighborhood of the axis of the driving spindle, and air outlets, not shown in the drawings, are provided in the part of the casing which lies around the rotor. The plate $D^8$ constitutes an indicator dial being suitably marked on its outer face which is covered by a glass window $H^2$. A U-shaped frame L is provided with trunnions $L^1$ and $L^2$ which are carried in bearings $D^9$ and $D^{10}$ disposed respectively in the part D of the casing and about the centre of the disc $D^8$. The outer end of the rotor arm J is carried in a suitable bearing $L^3$ in the frame L. On the end of the frame trunnion $L^2$ is fixed an indicator hand $L^4$. This trunnion is also provided with an arm $L^5$ conveniently directed oppositely to the indicator hand or pointer $L^4$ and to this arm is connected one end of a coiled spring $L^6$ whose other end is attached as at $L^7$ to some point on the dial plate $D^8$. In the arrangement illustrated a quadrantal slot $D^{11}$ is formed in the dial plate $D^8$ and a pin $L^8$ extends from the end of the arm $L^5$ through the slot $D^{11}$ one end of the spring $L^6$ being connected to this pin $L^8$. With this arrangement the spring $L^6$ can be disposed out of sight on the inner side of the dial plate $D^8$. A suitably curved shield $D^{12}$ is carried by the bearing $D^{10}$ and serves as an inner casing to enclose that part of the rotor which lies in the tubular portion $D^7$ of the outer casing. The arms of the swinging frame L are preferably extended as at $L^9$ beyond the trunnions $L^1$, $L^2$ and weighted so as to balance the frame about the trunnion axis.

With this construction, in the event of angular displacement of the spindle A, owing to the precession of the rotor, this frame L is caused to swing through an increased angle about the axis of the trunnions $L^1$, $L^2$ and thus to give a correspondingly magnified indication of the rate of deflection of the rotor by means of the pointer $L^4$ on the scale on the dial plate $D^8$. The spring $L^6$ will restrain the swinging movements of the frame L.

In the above described construction it will be seen that the axis of the trunnions $L^1$, $L^2$ passes through the centre of the spherical bearing member $A^1$. In the construction shown in Figure 5, the trunnion axis is displaced to one side of the centre but passes through the axis of the spindle A. This provides an alternative method of restraining the swinging movements of the frame L.

Owing to this displacement of the trunnion axis, it is necessary to modify the connection between the rotor C and the frame L through the arm J, the latter being here provided with a part which can slide telescopically in the direction of its axis. One form of such an arrangement which is illustrated in Figure 5 is shown on an enlarged scale in Figure 6. The outer end portion of the arm J is constituted by a pin $J^3$ of such length as to extend through a hole formed centrally in the bearing $L^3$ in the frame L. This bearing is cup-shaped and engaged by a ball $J^4$ which can slide on the pin $J^3$. Behind the ball is a collar $J^5$ which can slide on the pin $J^3$ and between this collar and the end of the main part J of the arm or a suitably disposed collar fixed on the arm is a coiled spring $J^6$ which tends to press the ball $J^4$ into the bearing $L^3$. When the frame L swings about its trunnion axis, the pin $J^3$ can slide through the ball $J^4$ in the bearing $L^3$ in the frame L against the resistance offered by the spring $J^6$ by which the ball will be maintained constantly in engagement with the bearing. This arrangement constitutes one method of exercising restraint on the displacement of the rotor.

In this construction there may be employed conveniently the device illustrated in Figure 6 as another means for applying restraint to the swinging movements of the rotor about the centre of the interengaging bearing members $A^1$ and $C^2$, $C^3$. The spindle A is formed hollow and carries therein a sliding rod K as in the construction illustrated in Figure 1, but in this case the rod K is pressed constantly inwards, so as to maintain its end in contact with the inner surface of the rotor hub bearing member $C^3$, by a spring $K^4$ interposed between a collar or cap $K^1$ on the end of the rod K and an adjustable screw stud $G^5$ mounted in the wall of the casing G which encloses the outer end of the spindle A and the mechanism through which this spindle is driven. By adjustment of the stud $G^5$ the pressure exerted by the spring $K^4$ on the rod K can be varied.

As in the arrangement of sliding rod K described in Figure 1, so here also if desired a ball may be interposed between the inner end of the rod K and the adjacent surface of the bearing cup $C^3$.

The two devices illustrated more particularly in Figure 6 may be combined as in the arrangement shown in Figure 7. The arm J which extends from the rotor is here formed hollow and a rod M can slide therein. The outer part $M^1$ of this rod engages and can slide through a ball $J^4$ which engages the bearing $L^3$ in the swinging frame as in the construction shown in Figure 6. The coiled spring $J^6$ is here interposed between a collar $M^2$ fixed on the rod M and the sliding collar $J^5$ which lies against the ball $J^4$. The pressure exerted by the spring $J^6$ on the one hand will restrain swinging movements of the frame L and maintain the ball $J^4$ in the bearing $L^3$ and on the other hand will press the rounded inner end of the rod M, or a ball which may be located there, against the surface of the spherical bearing member $A^1$.

In Figures 8, 9 and 10 there is illustrated by way of example one method of mounting the apparatus, which in this case is constructed as illustrated in Figures 1 and 2, this mounting being such as to permit angular adjustment of the casing and the apparatus contained therein. The casing D, $D^1$ is provided with trunnions $D^{13}$ carried in bearings N fixed in some convenient position on the moving body on which the deviation indicator is employed. The axis of these trunnions passes through the centre of the spherical bearing member A. The trunnions may be formed integral with two of the distance pieces $D^6$ described above as being interposed between the flanges $D^5$ with which the two parts D $D^1$ of the casing are provided but the trunnions may be otherwise formed or arranged as found desirable. One of the trunnion bearings N carries a fixed quadrantal plate $N^1$ having therein holes or indentations $N^2$ which are spaced apart circumferentially as may be found desirable. The trunnion $D^{13}$ which engages this bearing has fixed thereon a springy arm O at the end of which is a rounded stud $O^1$ adapted to enter into engagement with the holes or indentations in the fixed plate $N^1$. Conveniently a coiled spring P disposed around the trunnion $D^{13}$ tends to draw the arm O in towards the plate $N^1$.

By means of this device the whole apparatus can be swung about the axis of the trunnions $D^{13}$ and set at some desired angle when it will be retained by the action of the detent arm O, $O^1$.

By suitable modification of the means employed for indicating the deflections of the rotor axis from coincidence with the spindle axis, the apparatus may be used for various purposes. Thus the apparatus can be used on aircraft to indicate changes of course either in the horizontal or vertical direction or lateral tilt. Again, it may be used where it is desired to maintain temporarily some member in a set position, either horizontal or vertical, when movement is taking place of the body on which the apparatus is mounted.

The structure and dimensions of the rotor may vary as found desirable and with regard to the purpose for which the apparatus is to be employed. The details of the whole construction may also be modified as found necessary.

What I claim as my invention and desire to secure by Letters Patent is:—

1. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, and means for causing slip between the engaging bearing surfaces such that in the event of angular displacement of the spindle the rotor will not be constrained to maintain its axis coincident with the spindle axis but the rotor axis will be able to oscillate about the bearing centre.

2. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, and means for applying to the rotor a restraining force which will cause such slip to occur between the frictionally engaging curved surfaces that the rotor will rotate at a speed which is less than that of the spindle.

3. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, and vanes mounted on the rotor and serving by reason of fluid action thereon to apply to the rotor a force which will restrain it from rotating at the same speed as the spindle without impeding oscillations of the rotor axis which may take place about the bearing centre.

4. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, an arm extending from the rotor so as to be coincident with the rotor axis, and a mark disposed in fixed relation to the spindle axis, the movements of the arm in relation to the mark indicating deflections of the rotor axis about the bearing centre and relatively to the spindle axis.

5. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for applying to the rotor a restraining force which will cause such slip to occur between the frictionally engaging curved surfaces that the rotor will rotate at a speed which is less than that of the spindle, an arm extending from the rotor so as to be coincident with the rotor axis, and a mark disposed in fixed relation to the spindle axis, the movements of the arm in relation to the mark indicating deflections of the rotor axis about the bearing centre and relatively to the spindle axis.

6. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, an arm extending from the rotor so as to be coincident with the rotor axis, a mark disposed in fixed relation to the spindle axis, the movements of the arm in relation to the mark indicating deflections of the rotor axis about the bearing centre and relatively to the spindle axis, a casing enclosing the apparatus and having a conical part within which lies the end portion of the arm projecting from the rotor, a window closing the outer end of the conical part, and an antifriction device carried towards the end of the indicator arm and adapted to make contact with the conical part in the event of excessive oscillations of the rotor axis relatively to the spindle axis.

7. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, a casing mainly spherical in form enclosing the end of the spindle and the rotor thereon, a bearing in one side of the casing for the spindle, vanes mounted substantially radially on the rotor with their outer edges lying clear of the inner surface of the casing, these vanes being constructed and arranged so that fluid action thereon will restrain the rotor from rotating at the same speed as the spindle, while not impeding oscillation of the rotor axis about the bearing centre, a window in the casing, one or more locating marks on the window, and an indicator carried by the rotor in such a position that it will cooperate with the fixed marks on the casing window and indicate deflections of the rotor axis relatively to the spindle axis.

8. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, a casing enclosing the apparatus, a bearing in one side of the casing for the rotatable spindle, and means for supporting the casing so that it is angularly adjustable about an axis perpendicular to the rotational axis of the rotor.

9. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, and means for constraining the axes of the rotor and spindle to return to substantial coincidence when deflection of the rotor axis has occurred.

10. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, and means for constraining oscillations of the rotor axis relatively to the spindle axis in one plane whereby increased deflection of this axis tends to take place in a plane at right angles to that in which the constraint is exerted.

11. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, means for constraining oscillations of the rotor axis relatively to the spindle axis in one plane whereby increased deflection of this axis tends to take place in plane at right angles to that in which the constraint is exerted, and means for exerting a restraint on the increased deflections of the rotor axis thus produced.

12. A deflection or deviation indicator including in combinatoin a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, a casing enclosing the rotor, a bearing in the casing for the rotatable spindle, a frame mounted within the casing; trunnions supporting the frame within the casing, the trunnion axis passing through the axis of the rotatable spindle, an arm extending from the rotor so as to be coincident with the rotor axis, a bearing in the swinging frame engaged by this arm, and means for indicating the movements of the frame about the trunnion axis due to oscillations of the rotor axis about the bearing centre.

13. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means for causing slip between the engaging bearing surfaces such that in the event of angular displacement of the spindle the rotor will not be constrained to maintain its axis coincident with the spindle axis but the rotor axis will be able to oscillate about the bearing centre, a member lying adjacent to the surfaces of the bearing members and carried by and movable on the axis of rotation of one of the rotating members, and means whereby this movable member can be pressed into contact with the bearing surface which lies opposite to it for the purpose set forth.

14. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, means whereby slip is caused to occur between the engaging bearing surfaces such that in the event of angular displacement of the spindle the rotor will not be constrained to maintain its axis coincident with the spindle axis but the rotor axis will be able to oscillate about the bearing centre, a rod mounted to slide within the rotatable spindle one end of this rod lying adjacent to the interengaging bearing surfaces, and with a rounded part disposed at the end of the rod and adapted to be pressed into engagement with the bearing surface which lies opposite to it for the purpose set forth.

15. A deflection or deviation indicator including in combination a rotatable spindle, a rotor substantially balanced about its centre of rotation, bearing members having interengaging curved bearing surfaces respectively carried by the spindle and the rotor, the curvature of the surface of each of these bearing members being such as to coincide with the surface of a sphere whose centre lies on the spindle axis, rotation being transmitted from the spindle to the rotor by friction between the curved bearing surfaces, a casing mainly spherical in form enclosing the end of the spindle and the rotor thereon, vanes mounted substantially radially on the rotor with their outer edges lying clear of the inner surface of the casing, these vanes being constructed and arranged so that fluid action thereon will restrain the rotor from rotating at the same speed as the spindle while not impeding oscillation of the rotor axis about the bearing centre, a bearing in one side of the casing for the spindle, a window in the casing, one or more locating marks on the window, an indicator carried by the rotor in such a position that it will cooperate with the fixed marks on the casing window and indicate deflections of the rotor axis relatively to the spindle axis, and means whereby the axes of the rotor and spindle may be constrained to return to substantial coincidence when deflection of the rotor axis has occurred.

In testimony whereof I have signed my name to this specification.

JOHN POLLOCK BROWN.